Sept. 22, 1953          L. MUCHY          2,652,942
METHOD OF AND APPARATUS FOR ATTACHING
CLINCH NUTS TO SHEET METAL MEMBERS Filed July 2, 1949          5 Sheets-Sheet 1

Inventor
Louis Muchy
By
Spencer, Willets, Helmig & Caillio
Attorneys

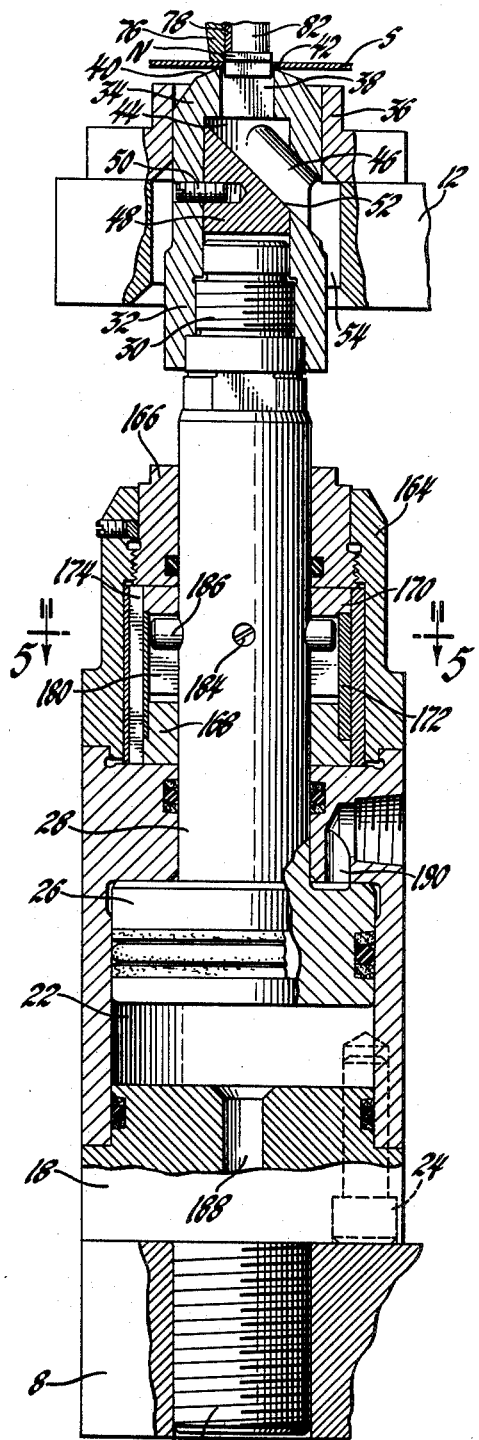

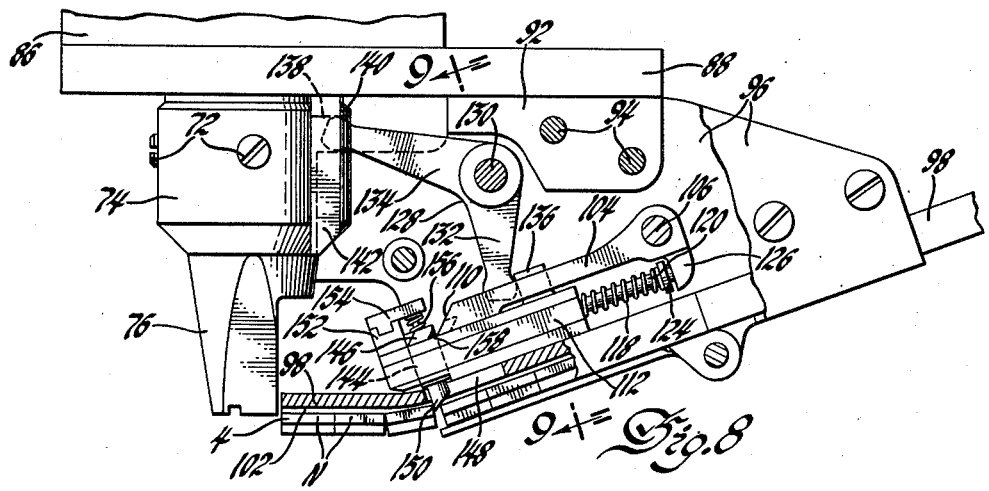

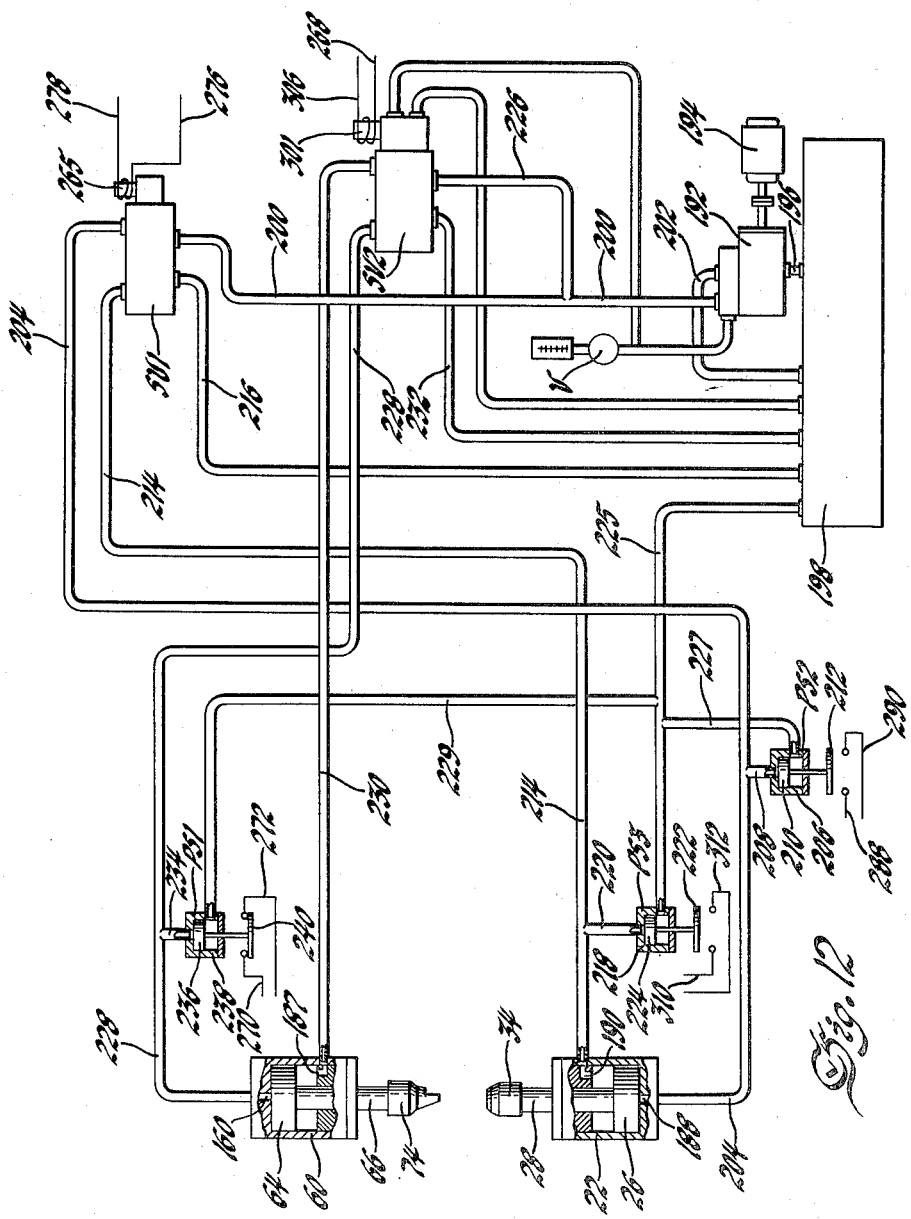

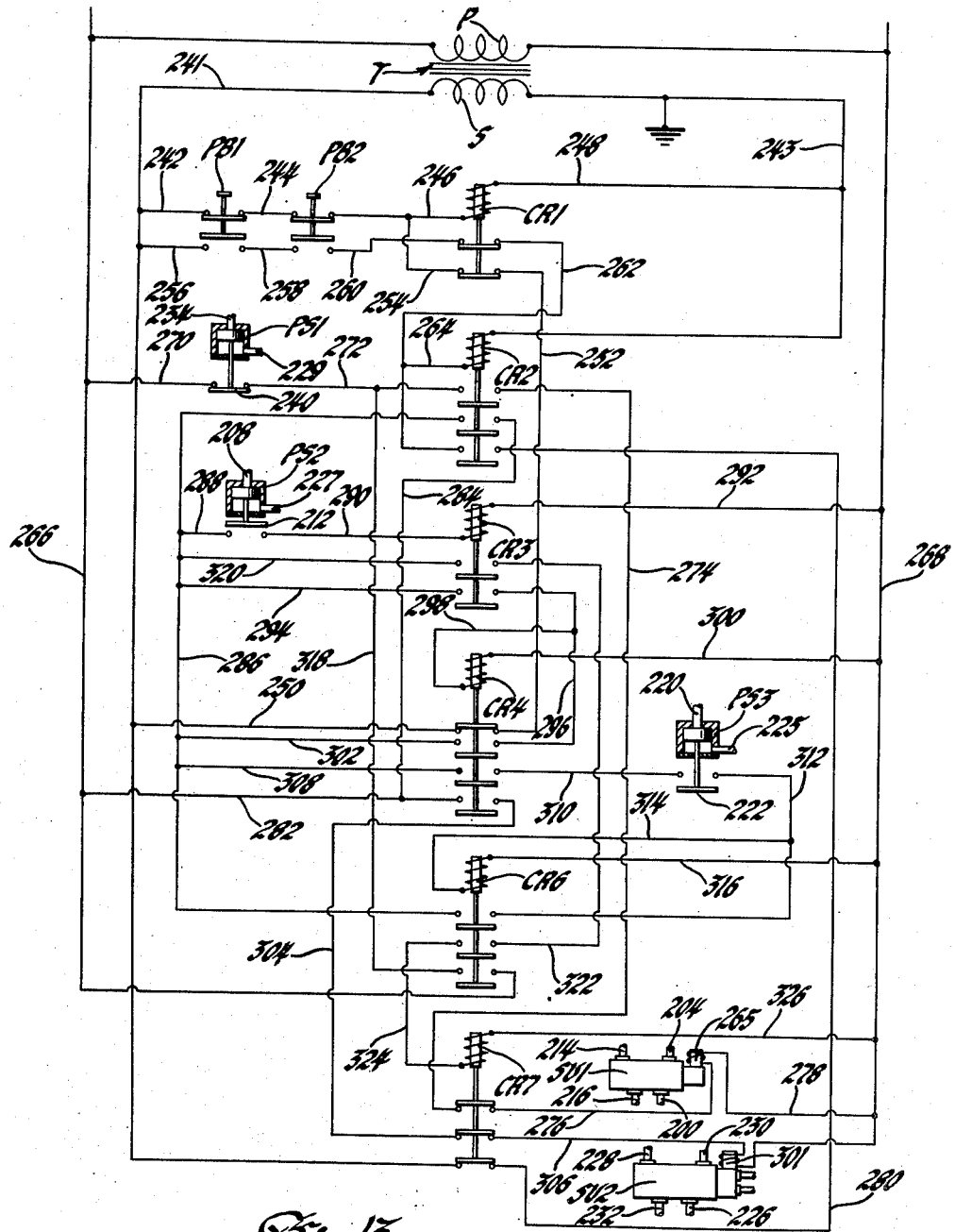

Patented Sept. 22, 1953

2,652,942

UNITED STATES PATENT OFFICE 2,652,942

METHOD OF AND APPARATUS FOR ATTACHING CLINCH NUTS TO SHEET METAL MEMBERS

Louis Muchy, Detroit, Mich., assignor to General Motors Corporation, Detroit, Mich., a corporation of Delaware Application July 2, 1949, Serial No. 102,828

12 Claims. (Cl. 218—2)

1

This invention relates to a method of and apparatus for attaching clinch nuts to sheet metal members.

The common practice in attaching clinch nuts to sheet metal members has been to first punch holes of the desired shape and size in the members on an ordinary punch press, then insert the clinch nuts into the holes either manually or by a feeding and inserting machine, and finally to place the sheet metal member in another machine where portions of the nuts are staked over or otherwise deformed to cause the nuts to become clinched in place on the sheet metal member. This not only requires considerable labor because of the several operations involved and the necessary handling of the clinch nuts and the metal sheets incident thereto, but also presents the problems of having to frequently sharpen or replace the die which serves to punch the holes in the sheet metal member to receive the clinch nuts, and the difficulty in holding the size of the holes within the necessary limits to insure that the clinch nuts will fit properly in them.

My invention eliminates these objections by making it possible to quickly perform all of the operations incident to the attachment of the clinch nuts in a single machine. Also, by arranging this machine so that each clinch nut will serve as a die to punch its own hole in the sheet metal member to which it is to be attached, and will remain in the hole it has punched, not only is the sharpening or replacement of dies eliminated, but there is considerable saving of labor in handling and assembling operations. A further saving is effected by causing the nuts to become staked or clinched in place in the sheet metal members immediately following the hole punching operation, simply by rotating a part of the machine a quarter of a revolution and then bringing it into contact with the nut whereby the corners of the latter will be expanded or staked over to engage the sheet metal member to hold the nut in place in the hole therein.

Other objects and advantages of the invention will become apparent upon reference to the specification and accompanying drawings, in which Figure 1 is a fragmentary elevational view of a machine embodying the invention.

Figure 4 is a vertical sectional view, through the lower portion of the machine shown in Figure 1.

2

Figures 1, 2, 3:
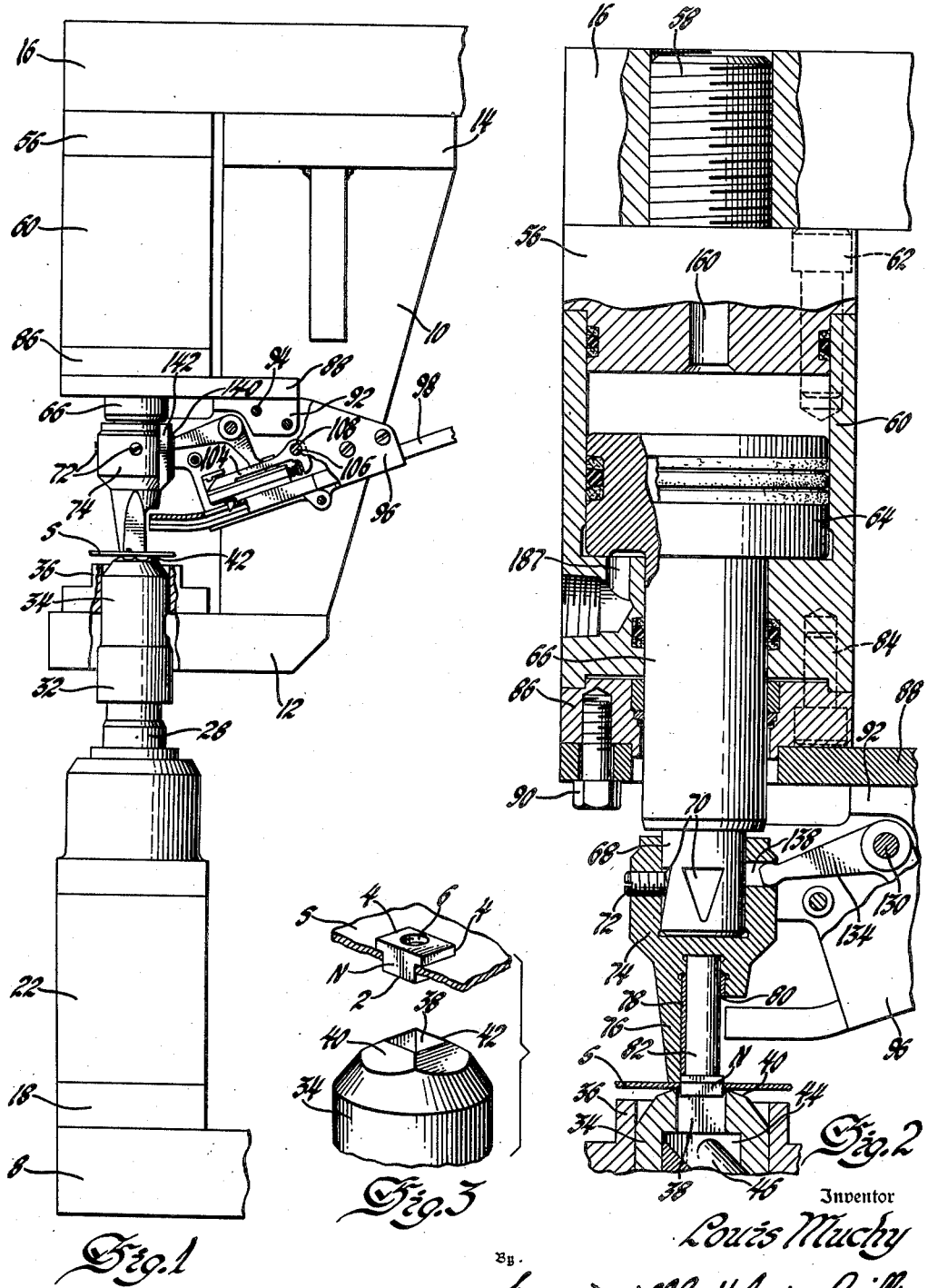
Figure 2 is a vertical sectional view, on a larger scale, through the upper portion of the machine shown in Figure 1.
Figure 3 is a fragmentary perspective view, showing a sheet metal member with a clinch nut in position in a hole it has punched therein, located over a portion of the machine which has cooperated in the punching operation, and will serve in the next operation to clinch the nut in place.

Figure 5 is a sectional view, taken on the line 5—5 of Figure 4.

Figure 6 is a fragmentary vertical sectional view through a portion of the machine.

Figure 7 is a fragmentary developed view of part of the structure shown in Figure 6.

Figure 8 is an enlarged elevational view of the clinch nut feeding mechanism.

Figure 9 is a sectional view, taken on the line 9—9 of Fig. 8.

Figure 10 is a perspective view of a portion of the mechanism shown in Figure 8.

Figure 11 is a fragmentary perspective view of a clinch nut mounted in a hole in a sheet metal member, in inverted position to show how the nut appears after it has been clinched in place.

Figure 12 is a diagrammatic view showing the hydraulic cylinders which operate portions of the machine, the valves for controlling the operation of such cylinders, and the piping therebetween.

Figure 13 is a wiring diagram showing the electrical apparatus which actuates the valves and thereby controls the sequence of operations of the machine.

The form of clinch nut used with my invention is shown in Figure 3, the nut being designated generally by the letter N, and consisting of a body portion 2 which is of substantially square form in cross-section, and having flanges 4 projecting outwardly from two of its opposite sides. A threaded hole 6 extends through the nut. The sheet metal to which the clinch nut is to be attached is designated by the letter S.

In Figure 1, there is shown a general view of the machine which serves to attach the clinch nuts to the sheet metal. It consists of a base 8 and frame 10, there being spaced stationary supporting members 12, 14 and 16 extending horizontally from the frame. Referring to Figure 4, 18 is a cylinder end member having a threaded portion 20 received in a hole in the base, and 22 is a cylinder which is connected to the end member by bolts 24. A piston 26 having a rod 28 extending upwardly therefrom, is mounted within the cylinder. The upper end of the piston rod is threaded at 30 to receive the base 32 of a female die member 34 which is slidably supported for vertical reciprocatory movement in a stripper collar 36 which is secured to the support member 12.

The die member has a square hole 38 formed in it, and the upper edge is ground away at an angle, as at 40 to provide shearing edges 42 around the hole 38. The lower end of the latter communicates with a larger central bore 44 formed within the die, there being a discharge opening 46 formed in the wall of the die at one side thereof. 48 is a plug secured in the bore of the die by set screw 50, the plug having an inclined face 52 which directs slugs dropping into the bore out through the discharge opening 46, there being a relatively large hole 54 formed in the support member around the die to permit the slugs to drop downwardly out of the machine.

Referring now to Figure 2, a cylinder end member 56 is secured to support 16 by a portion 58 which is threaded thereinto. A cylinder 60 is secured to end member 56 by screws 62. 64 is a piston located within the cylinder 60 and having a rod 66 extending downwardly therefrom, the lower end portion 68 being of reduced diameter and having a plurality of flats 70 provided thereon. Secured to end portion 68 by set screws 72, which bear on one of the flats 70, is a punch member 74, the lower end 76 of which is of reduced diameter, and has secured within it a bushing 78 formed of non-ferrous material, the bushing and the lower end 76 of the punch member being cut away at one side thereof, as indicated at 80, for a purpose to be hereinafter described. 82 is a permanent magnet, formed of any suitable material, which is mounted within the bushing 78, the upper end of the magnet seating against the punch member 74.

Secured to the lower end of the cylinder 60 by screws 84 is an adapter 86 to which a plate 88 is fastened by screws 90. A spacer member 92 is connected to the plate 88 in any suitable manner, and secured on opposite sides of the spacer member by bolts 94 are a pair of side plates 96. A chute 98 is clamped between these side plates, and leads upwardly to an overhead hopper (not shown) of any suitable type which is adapted to feed the clinch nuts in proper position into the chute. As shown in Figure 9, the chute is of inverted U-shape in cross-section, being provided with grooves 100 at each side, into which grooves the flanges 4 of the clinch nuts N fit sufficient loosely so that the nuts may freely slide downwardly in the chute, the body portion 2 of the nuts projecting downwardly through a slot 102 in the lower face of the chute.

Mechanism for advancing the clinch nuts in the chute and feeding them one at a time to the punch is shown in Figures 8–10. This consists of a forked member 104 which is pivotally supported between the side plates by a trunnion portion 106 each end of which fits into an opening 108, shown in Figure 1, formed in each of the plates. Located between the plates immediately beneath the forks of the member 104 which are bevelled as at 110, is a slide 112 provided with tongues 114 which fit freely within grooves 116 which are formed in the side plates. A compression spring 118 supported on a pin 120 has one end extending within a hole 122 formed in the slide, that end of the spring bearing against the bottom of the hole and the other end bearing against the head 124 of the pin, which in turn bears against an arm 126 depending from the member 104, the effect of the spring being to tend to move the slide 112 toward the left, as viewed in Figures 8 and 10.

The slide 112 is moved in the opposite direction by a lever 128, which is pivoted on pin 130 supported in side plates 96, the lever being provided with arms 132 and 134. The free end of the arm 132 bears against a projection 136 which extends upwardly from the slide 112 between the forks of member 104. The free end of arm 134 fits within a slot 138 formed in the punch member 74, so that as the latter moves downwardly, the lever rocks about the pivot pin 130 and the arm 132 bearing against the projection 136 causes the slide 112 to move to the right as viewed in Figures 8 and 10, during which movement it causes the spring 118 to become compressed.

The punch member 74 is provided with a projection 140 which has a finished face portion 142 at each side, which face portions bear against the inner surfaces of the side plates 96 during the up and down movement of the punch member to prevent rotation of the latter.

The slide 112 has a vertically extending slot 144 formed through it, and mounted in this slot is a pusher 146 which is adapted to slide up and down in the slot. The lower end of the pusher extends downwardly through an elongated slot 148 formed in the top of the chute 98, and is cut angularly to form a pointed edge 150 which is adapted to engage the side edge of the nut N which happens to lie immediately beneath it, as shown in Figure 8. Extending upwardly from the slide is a projection 152 which has a plate 154 secured to it, the free end of the plate extending over the pusher 146. A compression spring 156 is located between the plate and the upper end of the pusher, and serves to urge the pusher downwardly to the position shown in Figure 8. The upper end of the pusher is provided with a bevelled surface 158 which is adapted to be engaged by the bevelled surfaces 110 on the fork member 104 when the slide is moved to the right, as viewed in Figures 8 and 10, by the arm 132 on the lever 128. When such engagement takes place, the bevelled surface 158 will ride upwardly on the bevelled surfaces 110 and will thereby cause the pusher to be lifted upwardly out of engagement with the nuts N in the chute, so that as the slide 112 continues to move to the right, there will be no tendency for the pusher to move the nuts upwardly in the chute. The movement just described takes place as the punch member is moved downwardly. When this downward movement, and the punching operation which will be presently described, has been completed, the punch member moves upwardly and the arm 132 on lever 128 is thereupon moved to the left, as viewed in Figure 8. This permits the spring 118, which has previously been compressed, to cause the slide 112 to likewise move to the left, and as it does so, the bevelled surface 158 on the pusher will slide downwardly on the bevelled surfaces 110 on the forked member, thereby allowing spring 156 to move the pusher downwardly so that its pointed edge 150 engages the side of the nut N immediately below it in the chute, and as the slide 112 continues to move to the left, the column of nuts in the chute is moved along therein so that the lowermost nut is fed out of the chute beneath the punch member, where it is held in position by the magnetic force set up by the permanent magnet 82 located within the punch member.

The first step in the operation of the method and machine, after the sheet metal member S has been located in the proper position under the punch, with its lower surface resting on top of the die member 34, is to operate the controls, which will be presently described, which will cause hydraulic pressure to be supplied to the cylinder 60 through passage 160. This will serve to move the piston 64, and the punch 74 which is secured to piston rod 66, downwardly with considerable force and since one of the nuts N is held on the lower end of the punch by the permanent magnet, the body portion 2 of the nut is driven through the sheet S, the metal being sheared between the sharp edge at the top of the die around the square hole 38 and the edge of the body portion of the nut, and the piece of metal which is cut out of the sheet metal by the body portion of the nut serving as a punch dropping downwardly through the hole 38 and out through the discharge opening 46. At this time the nut is in the position shown in Figures 2-4, i. e., the body portion 2 of the nut extends through the hole it has punched, and the flanges 4 bear against the upper surface of the sheet, as best shown in Figure 3.

The next operation serves to stake the nut in position in the hole it has punched, so that it will be positively held therein. This is accomplished by rotating the female die 45° so that the center portions of its shearing edges 42 will extend diagonally across the corners of the body portion of the nut when it is brought into engagement with the latter, and when pressure is applied will serve to displace the metal in these corners, as shown at 162 in Figure 11, so that the nut is securely staked in place in the hole in the sheet metal.

The female die is rotated by the mechanism shown in Figures 4 to 7. Mounted on top of cylinder 22 is a housing 164, the upper end of which is closed by a cap 166, through which cap the piston rod 28 extends. Held within the housing is a lower cam member 168 and an upper cam member 170, which are separated from each other by a spacer collar 172, and are locked together by a key 174. The lower cam member is provided with a plurality of spaced notches 176, which extend angularly around the space between the piston rod 28 and the spacer collar 172. Between the notches 176 inclined cam surfaces 178 are provided. The upper cam member is likewise provided with spaced notches 180 between which are cam surfaces 182, which are inclined in the opposite direction from the cam surfaces 178.

Secured in the piston rod by a set screw 184 is a pin 186, the projecting ends of which are adapted to be received in the notches 176 and 180. Since the pin is secured in the piston rod, it moves up or down with the latter as the piston 26 is moved up or down. In Figures 4 to 7, the ends of the pin 186 are shown lying in two of the oppositely disposed notches 180 in the upper cam member, since in those figures the piston 26, piston rod 28 and female die 34 are shown in their uppermost position, in which they are held by hydraulic pressure supplied to the cylinder 22 through passage 188.

Immediately after the punching operation has taken place, the hydraulic pressure entering through passage 188 is relieved, and pressure is supplied on the opposite side of piston through passage 190, forcing the piston and piston rod downwardly. When pin 186 engages the inclined cam surfaces 178, it slides downwardly thereon and thereby causes the piston rod to be rotated in a clockwise direction until the pin enters notches 176 in the lower cam member. The spacing and relative location of the notches in the upper and lower cam members is such that in traveling downwardly from the notches in the upper cam member to the next pair of notches in the lower cam member, the piston rod is rotated 22½°. At the end of the downward movement of the piston, the pressure entering through passage 190 is relieved, and pressure is again applied through passage 188, which forces the piston 26, piston rod 28 and female die 34 upwardly again. During this upward movement, as soon as the ends of the pin 186 engage the cam surfaces 182 on the upper cam member, they slide upwardly over the latter, thereby causing the piston rod 28 to be rotated still further in a clockwise direction, until the ends of the pin come to rest in a pair of notches 180 in the upper cam member. The amount of rotation during this upward movement is likewise 22½°, and this added to the 22½° which took place during the downward movement, makes a total of 45° rotation which takes place each time the female die is moved downwardly and then upwardly again by the piston 26 and piston rod 28.

After the staking operation by the female die has been completed, the latter is again moved downwardly and then upwardly by piston 26, and since it again is rotated 45° during these two movements, it is now in a position where it has been rotated 90° from the position first described. In its present position, the sides of the square hole 38 will be parallel to the sides of the body portion of the nut held immediately above it on the punch by the permanent magnet, so that the female die is now in proper position to provide the cutting edges when the punch descends again to force the body portion of the clinch nut through the sheet metal.

Immediately after the staking operation is completed, the hydraulic pressure which has been holding the punch down so that it may serve as an anvil during the staking operation, is relieved and pressure is admitted on the opposite side of the piston 26 through passage 187, thereby moving the punch upwardly and actuating the feeding mechanism to advance another nut into position under the punch where it is held by the permanent magnet.

It will be seen that every other time the number 34 is at its upper limit of travel, the hole 38 in it is in such position relative to the body portion of the nut immediately above it that it is adapted to serve as a female die to assist in cutting out the piece of the metal sheet which must be removed to allow the nut body portion to extend through the sheet, and that at the alternate times it is at its upper limit of travel, it is turned 45° so that the central portions of the side edges of the hole 38 extend diagonally across the corners of the body portion in order that they may serve to flatten or stake over these corners to lock the nut in position in the metal sheet.

After this latter operation has been completed, the metal sheet S is moved to another position where it is desired to insert a clinch nut in it, and the operator actuates the starting control which causes the machine to repeat the cycle of operations described above. In other words, all that the operator has to do is to place the metal sheet in the proper position in the machine and start the latter, and thereafter the sequence of operations is automatically performed and when these are completed, the machine is shut off.

This automatic operation of the machine is brought about by the folowing structure. In Figure 12 there is shown diagrammatically the piping and valves which control the flow of hydraulic pressure to the cylinders which produce the necessary sequence of movements of the punch 14 and the female die member 34. 192 is a pump driven by an electric motor 194, the inlet side of the pump being connected by a pipe 196 to a fluid supply chamber 198, and the outlet side by pipe 200 to a solenoid valve designated as SVI, which is a conventional four-way valve which is operated by an electrically actuated solenoid. Another pipe 202 leads from the outlet side of pump 192 back into chamber 198 to maintain a reduced amount of pressure in the latter.

At the beginning of the sequence of operations described above, when the operator actuates the starting control, the valve SV1 is moved to a position wherein fluid pressure entering it through pipe 200 is permitted to flow out through pipe 204 which is connected to passage 188 in the cylinder 22. This forces piston 26 upwardly moving the female die member 34 to its uppermost position, in which position the metal sheet S rests upon it. At the end of this upward movement, the pressure built up in pipe 204 enters a pressure switch designated generally as PS2. This consists of a cylinder 206, one end of which is connected by pipe 208 to pipe 204, and containing a piston 210 to which is connected a switch contact member 212.

Passage 190 leading into cylinder 22 is connected by pipe 214 to valve SV1, and 216 is a pipe which conducts fluid returning through the valve SV1 back into the supply chamber 198. Leading from pipe 214 into cylinder 218 of a pressure switch PS3 is a pipe 220, and 222 is a switch contact member which is actuated by piston 224 in this cylinder, when the fluid pressure within pipe 214 reaches its maximum.

Branching off from the pressure supply pipe 200 is a pipe 226 which leads into another four-way valve designated as SV2, which is also solenoid operated. A pipe 228 conducts fluid pressure from this valve to passage 160 leading into cylinder 60 when the punch member 74 is to be forced downwardly. Pipe 230 leads from passage 187 in cylinder 60 to valve SV2, and 232 is a pipe through which fluid returning through the valve SV2 is conducted back into supply chamber 198.

A pressure switch designated as PS1 is connected by pipe 234 with pipe 228 and is adapted to be actuated whenever the fluid pressure in the latter reaches its maximum, piston 236 in the cylinder 238 moving switch contact member 240.

Leading up from the fluid supply chamber 198 is a pipe 225 which is connected into cylinder 218 of pressure switch PS3. Branching off from pipe 225 are pipes 227 and 229, pipe 227 connecting into cylinder 206 of pressure switch PS2, and pipe 229 connecting into cylinder 238 of pressure switch PS1. Each of the pressure switches is returned to the position in which they are shown in Figure 12 by the fluid pressure supplied to them from the chamber 198 through pipes 225, 227 and 229.

In Figure 13 there is shown a wiring diagram of the electrical circuit which serves to control the flow of fluid pressure to the power cylinders 22 and 60, the solenoid valves SV1 and SV2, and the pressure switches PS1, PS2 and PS3 being shown diagrammatically in this figure, and the piping between these various members being broken away to clarify the drawing.

A suitable power source is provided, and as shown in Figure 13, the primary P of a transformer T is connected to this power source which in the apparatus being described is 440 volts. Conductors 241 and 243 lead a 110 volt circuit from the secondary S of the transformer. PB1 and PB2 are push buttons and CR1 is a relay which are connected by conductors 242, 244, 246 and 248 with the conductors 241 and 243. At the beginning of the sequence of operations of the machine, the upper contacts of both push buttons are closed, so that the winding of the relay CR1 is energized and its contacts are closed. A parallel holding circuit is provided for the winding of the relay CR1, this holding circuit including the lower normally closed contacts of relay CR1 and the normally closed upper contacts of the relay CR4 and the conductors 250, 252 and 254, the latter being connected to conductor 246.

To start the sequential operation of the power means, the operator is required to press both control buttons PB1 and PB2. As the lower contacts of these push buttons and also the upper contacts of the relay CR1 are connected in series by conductors 256, 258, 260, 262, 264 and 243 with the coil of relay CR2, this coil will be energized and all of its controls will close. It will be noted that the upper contacts of the relay CR2 are connected in series with the pressure switch PS1, the upper normally closed contacts of relay CR7 and the winding 265 of the valve SV1 across the 440 volt primary power source indicated by the conductors 266 and 268 which are connected to the primary of the transformer. The above series connections comprise conductors 266, 270, 272, 274, 276, 278 and 268. This causes the energization of valve SV1 to move the latter to a position wherein fluid pressure from the pump 192 is allowed to flow through pipe 204 and passage 188 into cylinder 22, thereby moving the female die 34 to its upper position. As explained above, the metal sheet S rests upon this die, in proper position to receive a clinch nut at the desired location.

The simultaneous closure of the lower contacts of relay CR2 which are connected in series with the lower contacts of relay CR7 by conductors 262 and 280 across the conductors 241 and 243 establishes a holding circuit for the winding of relay CR2. Simultaneous closure of the middle contacts of relay CR2 which are connected in series with conductors 266, 282, 284 and 286 sets up a circuit to these conductors. As the pressure in pipe 204 builds up, pressure switch PS2 is actuated. Its contacts are connected in series with the winding of relay CR3 by conductors 288, 290 and 292 across conductors 286 and 268. When the pressure is sufficient to close the contacts of switch PS2, the winding of the relay CR3 will be energized to cause closure of its contacts.

Closure of the lower contacts of relay CR3, which are connected in series with the winding of relay CR4 by conductors 294, 296, 298 and 300 across conductors 286 and 268, causes energization of the winding of relay CR4 thereby opening of the upper contacts and closure of the three lower contacts thereof. The opening of these upper contacts opens the above described holding circuit to the winding of the relay CR1 and it will drop out. The closure of the contacts second from the top of relay CR4, which are connected in series to conductors 286 and 296 by conductor 302, establishes a holding circuit comprising conductors 286, 302, 296, 298, 300 and 268 for the winding of relay CR4.

It will be noted that the lower contacts of relay CR4 are connected in series with the central contacts of relay CR7 and the winding 301 of solenoid valve SV2 by conductors 282, 304 and 306 across conductors 266 and 268. When this circuit is closed, winding 301 is energized and valve SV2 is moved to a position wherein fluid pressure from the pump 192 is permitted to flow through pipe 228 and passage 160 into the top of cylinder 60, thereby forcing punch member 74 downwardly and driving the body portion of the clinch nut which is held on the lower side of the punch member through the metal sheet, as previously described.

The contacts second from the bottom of relay CR4 are connected in series with the normally open contacts of pressure switch PS3 and the winding of relay CR6 by conductors 308, 310, 312, 314 and 316 across conductors 286 and 268. By this time sufficient pressure has been built up in pipe 228 to cause pressure switch PS1 to open and accordingly deenergize coil 265 of valve SV1, which causes the latter to move to a position wherein the pressure in pipe 204 will be free to return to the supply chamber 198, and pressure from the pump 192 will be allowed to flow through pipe 214 and port 190 with cylinder 22, which will cause the female die 34 to move downwardly, it being turned 22½° during this downward movement by the mechanism previously described.

At this time due to the pressure built up in pipe 214, pressure switch PS3 is closed which results in the energization of relay CR6 through conductors 286, 308, 310, 312, 314, 316 and 268. This causes closure of all of the contacts of relay CR6. As the upper contacts of relay CR6 are connected in series between conductors 286 and 312, a holding circuit is established through conductors 314, 316 and 268 to the winding of relay CR6. The lower contacts of relay CR6 which are now closed are connected in series between the conductors 266 and 272 by conductor 318, and an energizing circuit is completed through conductors 266, 318, 274, 276, 278 and 268 to the winding 265 of valve SV1, causing the latter to move again to position wherein fluid pressure from the pump will be permitted to flow through pipe 204 into the lower end of cylinder 22, causing the female die to move upwardly again, during which upward movement it will be turned another 22½°, so that it now will have been turned a total of 45° from the position it was in at the completion of the punching operation. As it strikes the corners of the body portion of the nut at the end of its upward movement, it forces the metal outwardly, as previously described, to hold the nut in position in the hole in the sheet metal.

The middle contacts of relay CR6 which are now closed are connected in series with the upper contacts of relay CR3 which are open, and the winding of relay CR7 and across conductors 286 and 268 by conductors 320, 322, 324 and 326. As a result of the pressure which is now built up in pipe 204, pressure switch PS2 closes again to cause reenergization and closure of relay CR3, which results in the energization of the winding of relay CR7 through conductors 286, 320, 322, 324, 326 and 268, and the opening of all of its contacts. The opening of the upper contacts of relay CR4 deenergizes winding 265 of valve SV1, moving the latter to position wherein the pressure in pipe 204 may return to chamber 198, and pressure from the pump is supplied through pipe 214 to the upper part of cylinder 22, which causes the female die to move downwardly, being turned 22½° during such movement.

The opening of the middle contacts of relay CR7 opens the circuit to winding 301 of valve SV2, and the opening of the lower contacts of relay CR7 opens the holding circuit of the winding of relay CR2. This causes deenergization of winding 265 of valve SV1, moving the latter to position wherein the pressure in pipe 214 is allowed to return to chamber 198, and pressure is supplied through pipe 204 to cylinder 22 to force female die 34 upwardly again, it being turned another 22½° during this upward movement. It is now in its starting position again. At the same time, winding 301 of valve SV2 is deenergized, moving the latter to position wherein the pressure within pipe 228 is allowed to return to the supply chamber, and pressure from the pump is permitted to flow through pipe 230 into the lower end of cylinder 60, thereby moving the punch member upwardly, during which upward movement the feeding mechanism is actuated to advance another clinch nut into position under the punch member, where it will be held by the permanent magnet 82, as previously described.

At this time all of the parts of the apparatus have been returned to their starting position, and the apparatus is ready to commence another sequence of the operations described above, but this will not take place until the operator again presses the starting buttons PB1 and PB2.

While a specific embodiment of my invention has been shown and described, it will be understood that various changes in practicing the method and in the construction of the apparatus may be made without departing from the spirit and scope of the appended claims.

I claim:

1. The method of attaching a clinch nut having a non-circular body to a sheet of material, which comprises holding the nut on a punch member, supporting the sheet on a die member, moving the punch member toward the sheet whereby said body of the nut is driven through the sheet into the die member retracting and rotating the die member, and thereafter moving the die member into engagement with said nut to stake a portion of the body of the nut farthest from the axis of said nut.

2. The method of attaching a clinch nut having a non-circular body portion to a sheet of material, which comprises holding the nut on a punch member, forcing said body portion through the sheet into a hole in a die member, retracting the die member and rotating it, and then utilizing the die member to stake a part of the body portion of the nut farthest from the axis of said nut.

3. The method of attaching a clinch nut having a non-circular body to a sheet of material, which comprises supporting the sheet on a die member, holding the nut on a punch member, moving the punch member toward the sheet whereby said body of the nut is driven through the sheet into the die member, retracting the die member and at the same time turning it to a different position, and then moving it toward the sheet, the edges of the die member forcibly engaging a portion of the body of the nut farthest from the axis of said nut to stake said portion.

4. In an apparatus for attaching clinch nuts to sheet material, the combination of a punch member, means associated with the punch member to hold a clinch nut thereon, a die member having a hole formed therein, said punch member being movable toward the die member to force a portion of the clinch nut through the sheet material into the hole in said die member and means for reciprocating the die member toward and away from the nut in the sheet material, said die member being rotatable relative to said nut while not in engagement therewith to cause the die member to contact said portion of the nut upon subsequent movement of said die member toward said nut to stake the corners thereof against the sheet material.

5. In an apparatus for attaching clinch nuts to sheet material, the combination of a punch member, means associated with the punch member to hold a clinch nut thereon, a die member having a hole formed therein, means connected to the punch member for driving said punch member downwardly to force a portion of the clinch nut through the sheet material into the hole in said die member, means connected to the die member for moving it downwardly and then upwardly, and means connected to the die member for rotating it a part of a revolution during such downward and upward movement to cause said die member to stake the corners of the body portion of the nut on its upward movement.

6. In an apparatus for attaching clinch nuts to sheet material, the combination of a punch member, means associated with the punch member to hold a clinch nut thereon, a die member located opposite said punch member, and means for rotating said die member to cause it to be adapted when in one position to cooperate with the punch member to force a portion of a clinch nut through the sheet material, and when turned to a different position being adapted to stake the corners of said portion of the clinch nut to hold the latter in position in the sheet material.

7. In an apparatus for attaching clinch nuts to sheet material, the combination of a punch member, means associated with the punch member to hold a clinch nut thereon, power means adapted to move said punch member toward the sheet whereby a portion of the nut will be driven through the sheet, a die member located opposite the punch member, power means adapted to retract said die member after the punching operation, means associated with said die member causing it to turn when retracted, the power means for operating said die member being also adapted to force the latter toward the sheet whereby the die member engages the corners of the portion of the nut which extends through the sheet to stake said corners, and control means adapted to control the sequential operation of said power means.

8. In an apparatus for attaching clinch nuts to sheet material, the combination of a punch member, means associated with the punch member to hold a clinch nut thereon, fluid pressure operated means adapted to move the punch member toward the sheet whereby a portion of the nut will be driven through the sheet, a die member located opposite the punch member, fluid pressure operated means adapted to retract said die member after the punching operation, means to turn said die member during the retracting movement, the last named fluid pressure operated means also serving to move the die member toward the sheet whereby the die member will engage the corners of the portion of the nut which extends through the sheet to stake said corners, valve means to control the flow of fluid pressure to said pressure operated means, and electrically actuated means serving to control the operation of said valves to produce the desired sequential operation of said pressure operated means.

9. The method of attaching a nut having a non-circular body portion and flanges extending therefrom to a sheet of material, which comprises forcing said body portion of the nut through the sheet and into a hole in a die member to form an opening in the sheet, said portion remaining in the opening, retracting and rotating the die member, and thereafter forcibly engaging said nut with said die member to stake over a part of the body portion of the nut farthest from the axis of said nut.

10. In an apparatus for attaching a clinch nut to a sheet of material, a punch member having means associated therewith to hold a clinch nut, a die member having a hole formed therein, means for relatively reciprocating the die member and the punch member toward and away from each other, said members when moved toward one another being adapted to force a portion of the clinch nut through the sheet into the hole in the die member, and means for partially rotating said die member and the nut in the sheet relative to each other when not in engagement to cause the die member to subsequently engage corners of the nut which extend through the sheet to stake over said corners.

11. In an apparatus for attaching clinch nuts to sheet material, the combination of a punch member, means connected to the punch member to hold a clinch nut thereon, a die member for supporting the sheet material and having a hole formed therein, means operatively connected to said die member and said punch member to cause said members to relatively move toward and away from each other, said members when moved toward one another being adapted to drive a portion of the clinch nut through the sheet material into the hole in the member, and means operatively connected to the die member for partially rotating said die member relative to the nut in said sheet when said die member and said nut are in spaced apart positions to thereby cause the die member to stake over said portion of the nut upon subsequent contact therewith.

12. In an apparatus for attaching clinch nuts to sheet material, the combination of a punch member, means connected to the punch member to hold a clinch nut thereon, means connected to said punch member for moving it toward the sheet whereby a portion of the nut will be driven through the sheet material, a die member located opposite the punch member, and means connected to said die member for retracting and rotating it after the punching operation, the means for retracting the die member also being adapted to force said die member against the clinch nut to stake the corners of said portion of the nut to hold the latter in position in the sheet material.

LOUIS MUCHY.

References Cited in the file of this patent

UNITED STATES PATENTS

| Number | Name | Date |
|---|---|---|
| 520,999 | Platt | June 5, 1894 |
| 521,825 | Shipe | June 26, 1894 |
| 909,231 | Sasseman | Jan. 12, 1909 |
| 1,500,926 | Curry | July 8, 1924 |
| 1,719,480 | Linden | July 2, 1929 |
| 2,187,647 | Double | Jan. 16, 1940 |
| 2,275,438 | Hothersall | Mar. 10, 1942 |
| 2,422,405 | Gookin | June 17, 1947 |
| 2,550,788 | De Swart | May 1, 1951 |

FOREIGN PATENTS

| Number | Country | Date |
|---|---|---|
| 550,233 | Great Britain | Dec. 30, 1942 |